United States Patent
Jung et al.

(10) Patent No.: US 7,639,415 B2
(45) Date of Patent: Dec. 29, 2009

(54) ELECTROCHROMIC DEVICE WITH IMPROVED DISPLAY PROPERTIES AND FABRICATION METHOD THEREOF

(75) Inventors: Jae Eun Jung, Seoul (KR); Jae Eun Jang, Seoul (KR); Chang Ho Noh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/933,220

(22) Filed: Oct. 31, 2007

(65) Prior Publication Data

US 2008/0304132 A1  Dec. 11, 2008

(30) Foreign Application Priority Data

Jun. 5, 2007   (KR) ................. 10-2007-0055133

(51) Int. Cl.
  *G02F 1/153* (2006.01)
  *G09G 3/38* (2006.01)
  *H04N 9/24* (2006.01)

(52) U.S. Cl. .................. 359/267; 345/105; 348/814; 359/270

(58) Field of Classification Search ......... 359/265–270, 359/272–275, 277, 245–247, 254; 345/49, 345/105; 349/182–186; 348/814; 250/70; 438/929

See application file for complete search history.

(56) References Cited

U.S. PATENT DOCUMENTS

2006/0204866 A1* 9/2006 Hirano et al. ............... 430/7

FOREIGN PATENT DOCUMENTS

| KR | 1020030030605 | 4/2003 |
| KR | 1020050063736 | 6/2005 |
| KR | 1020070047597 | 5/2007 |
| KR | 1020060084883 | 5/2008 |

OTHER PUBLICATIONS

Korean Intellectual Property Office, English Translation—Notice of Preliminary Rejection, Mar. 3, 2008.

* cited by examiner

*Primary Examiner*—Scott J Sugarman
*Assistant Examiner*—Dawayne A Pinkney
(74) *Attorney, Agent, or Firm*—Cantor Colburn LLP

(57) ABSTRACT

Disclosed are an electrochromic device and a method for fabricating the same. The electrochromic device comprises a transparent electrode, on which an electrochromic layer is formed, a counter electrode on which a reflective layer is formed, and an electrolyte layer interposed between the transparent electrode and the counter electrode. Since the electrolyte layer is formed in only an active region of unit pixels, neither crosstalk nor image diffusion occurs and only the selected region of unit pixels is operated. Thus, the electrochromic device can realize passive matrix displays capable of representing a desired color. Furthermore, the electrochromic device can be utilized in a variety of applications including flexible displays and electrical papers.

13 Claims, 3 Drawing Sheets

ELECTROCHROMIC DEVICE WITH IMPROVED DISPLAY PROPERTIES AND FABRICATION METHOD THEREOF

CROSS REFERENCE TO RELATED APPLICATIONS

This non-provisional application claims priority under 35 U.S.C. § 119 to Korean Patent Application No. 10-2007-0055133, filed on Jun. 5, 2007 in the Korean Intellectual Property Office (KIPO), the entire contents of which are incorporated herein by reference.

BACKGROUND OF THE INVENTION

1. Field of the Invention

This disclosure relates to an electrochromic device with improved display properties and a method for fabricating the same. Other exemplary embodiments include an electrochromic device that comprises an electrochromic layer, a reflective layer and an electrolyte layer, that minimizes cross-talk and image diffusion since the electrolyte layer is present in only an active region of unit pixels.

2. Description of the Related Art

"Electrochromism" is defined as a phenomenon in which the inherent color of some chemical species change reversibly according to the direction of an applied electric field. Based on such a phenomenon, an electrochromic material shows reversible changes in optical properties due to electrochemical oxidation/reduction reactions. More specifically, an electrochromic material exhibits no color when no electric field is externally applied, but exhibits its inherent color when an electric field is applied, or alternatively, an electrochromic material exhibits its color when no electric field is externally applied, but exhibits no color when an electric field is applied. Inorganic compounds (e.g. oxide tungsten or oxide molybdenum) and organic compounds (e.g. pyridine or aminoquinone compounds) display electrochromic properties.

Since electrochromic devices have advantages of high reflectivity in the absence of any external light source, superior flexibility, portability and light-weight, they are expected to be utilized in a variety of applications in flat panel displays. In particular, electrochromic devices have been the focus of intense interest lately owing to their potential applications in electrical papers (E-paper), which are actively researched as an electronic media capable of serving as substitutes for paper.

FIG. 1A is a cross-sectional view schematically illustrating the structure of a comparative electrochromic device. As shown in FIG. 1A, the electrochromic device has a structure in which an electrochromic material 20 is coated on an upper transparent electrode 10, and a counter material 40 and a light-reflective material 30 are coated on a lower counter electrode 50, the respective coated surfaces of the respective electrodes facing (being opposedly disposed to) one another.

The mechanism by which the electrochromic device of FIG. 1A displays white and specific colors will be explained with reference to FIGS. 1B and 1C.

When no electric field is applied, the electrochromic material 20 is transparent, thus transmitting light. On the other hand, when an electric field is applied, the electrochromic material 20 is oxidized or reduced, thus exhibiting its inherent color. That is to say, when no electric field is applied, since the electrochromic material 20 is transparent, it does not absorb any wavelength of light. Accordingly, all wavelengths of incident light passing through the upper transparent substrate 10 are reflected by the lower reflective layer 30 and are thus emitted back through the upper transparent electrode 10 at the front of the device. For this reason, an observer perceives a white color at the front of the display device (FIG. 1B).

On the other hand, when an electric field is applied, since the electrochromic material 20 is either oxidized or reduced, it shows its inherent color and absorbs all except the inherent color of wavelengths. Accordingly, only a wavelength of light, which has the same color as that the electrochromic material 20 passes through the upper transparent electrode 10 and the remaining wavelengths of light are absorbed in the electrochromic material 20. Only the inherent color of light from the oxidized or reduced electrochromic material 20 is emitted from the lower reflective layer through the upper transparent electrode 10 at the front of the device. For this reason, an observer perceives the inherent color at the front of the display device (FIG. 1C).

Similar to general devices, electrochromic devices realize color representation through unit pixel arrays, which represent colors of red, green and blue, respectively. However, conventional electrochromic devices have a disadvantage in that they cannot secure normal display properties because of crosstalk between adjacent pixels, which is an undesirable phenomenon resulting from the ionic conductivity of the electrolyte.

Viologen, which is the most intensely studied one of organic-based electrochromic materials, will be exemplified to explain the cause of the crosstalk.

When an electric field is applied to the space between opposite electrodes of an electrochromic device, viologen reacts with ions or electrons contained in an electrolyte, as depicted in the following reaction scheme 1, thus exhibiting variation in color.

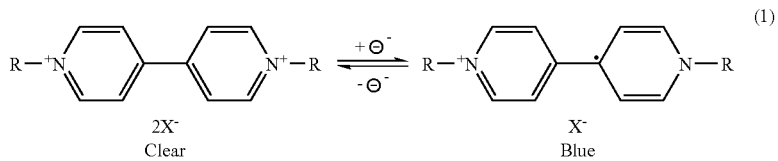

That is, a color change of viologen to the blue color (induced by the application of an electric field) is based on the fact that a radical mono cation gains an electron (i.e. reduced) derived from the electrolyte in oxidation/reduction reactions.

However, in another comparative electrochromic device as shown in FIG. 2, since an electrolyte fills all the space between unit pixels of the upper and lower electrodes, crosstalk or image diffusion inevitably occurs between adjacent unit pixels due to the ionic conductivity of the electrolyte.

As shown in FIG. 3, when only a specific pixel by selecting X and Y lines is intended to be driven, the ionic conductivity of the electrolyte causes crosstalk or image diffusion in which adjacent pixels as well as the specific pixel are driven. As a result, electrochromic devices present disadvantages in that they cannot secure normal display properties.

SUMMARY

Exemplary embodiments include an electrochromic device that causes neither crosstalk nor image diffusion since an electrolyte layer is formed in only an active region of a unit pixel by partial introduction of the electrolyte.

Another exemplary embodiment includes a method for fabricating the electrochromic device.

In accordance with yet another exemplary embodiment, there is provided an electrochromic device comprising: a transparent electrode comprising a transparent substrate and a conductive layer disposed on the transparent substrate; an electrochromic layer disposed on the transparent electrode; a counter electrode facing the transparent electrode and comprising a counter substrate and a conductive layer disposed on the counter substrate; a reflective layer disposed on the counter electrode; and an electrolyte layer interposed between the transparent electrode and the counter electrode, wherein the electrolyte layer is present in only an active region of a unit pixel.

The electrochromic device has little crosstalk and image diffusion since the electrolyte layer is not connected between adjacent unit pixels, instead, it is present in only an active region of the unit pixels.

In accordance with the exemplary embodiments, there is provided a method for fabricating an electrochromic device comprising: disposing an electrochromic layer on a transparent electrode; disposing a reflective layer on a counter electrode; assembling the transparent electrode and the counter electrode and introducing an electrolyte into the space between the transparent electrode and the counter electrode; and isolating the electrolyte into an active region.

BRIEF DESCRIPTION OF THE DRAWINGS

Exemplary embodiments will be more clearly understood from the following detailed description taken in conjunction with the accompanying drawings. FIGS. 1-4 represent non-limiting, exemplary embodiments as described herein.

FIG. 2 is a cross-sectional view schematically illustrating a comparative electrochromic device where an electrolyte is introduced into all the regions between upper and lower electrodes;

FIG. 3 shows crosstalk or image diffusion in a conventional electrochromic device; and FIG. 4 is a cross-sectional view schematically illustrating the structure of an electrochromic device according to the exemplary embodiments disclosed herein. The structure comprises (A) a barrier rib 1, (B) a barrier rib 2 and (C) a sealant.

Figure 1A:
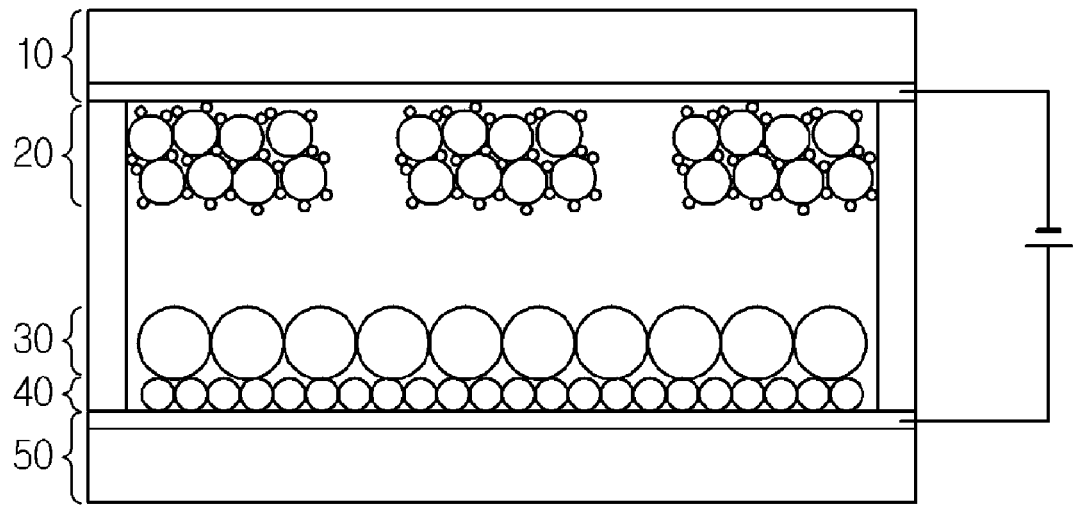
FIG. 1A is a cross-sectional view schematically illustrating the structure of a comparative electrochromic device.
Figure 1B:
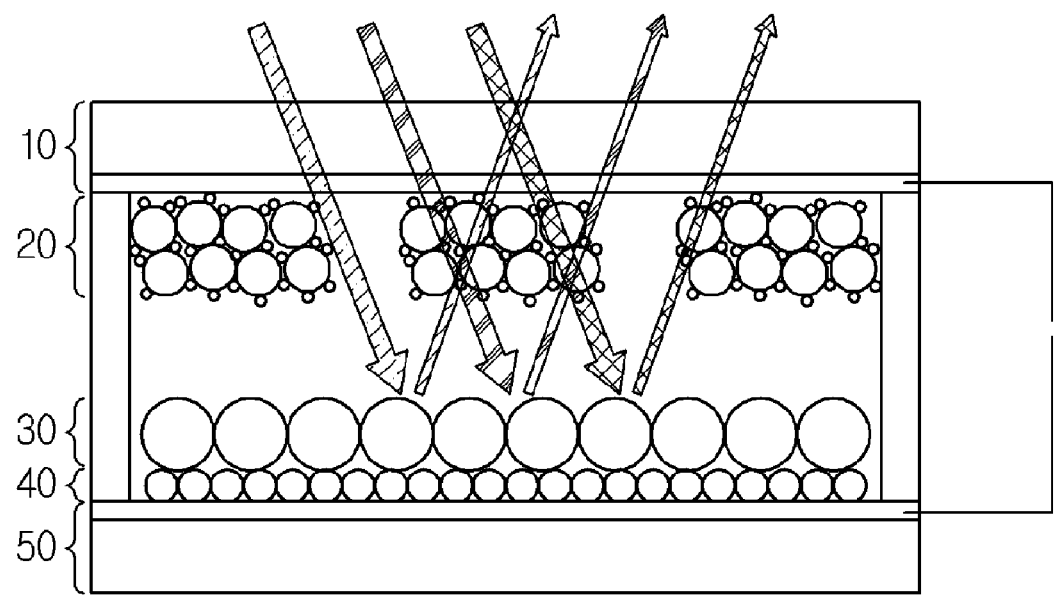
FIGS. 1B and 1C are cross-sectional views illustrating the mechanism by which a comparative electrochromic device displays white or specific colors.
Figure 1C:
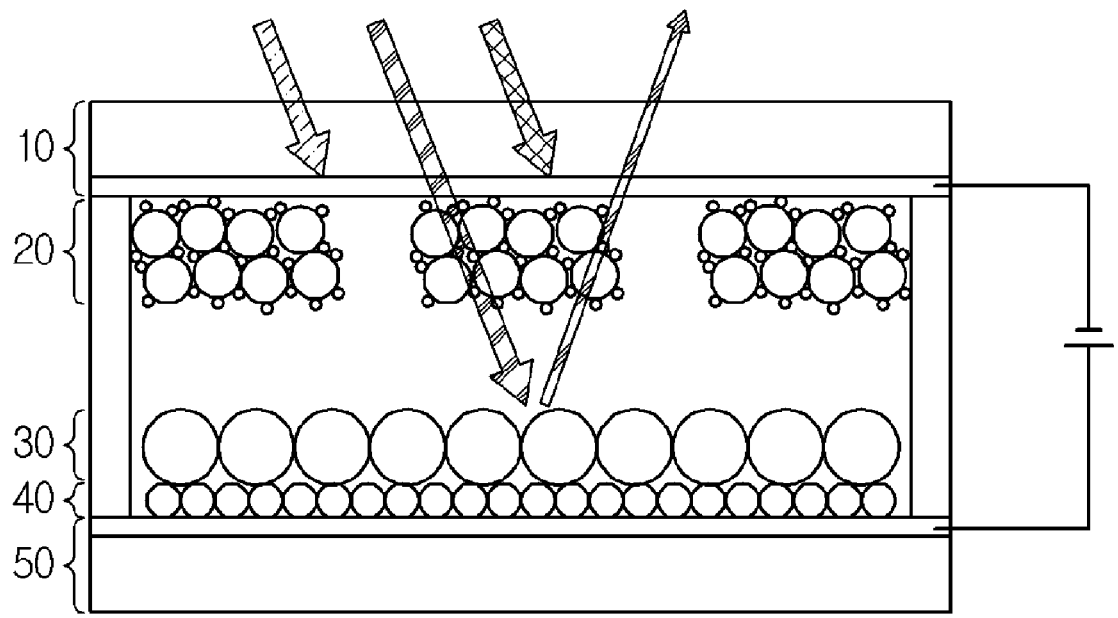

It should be noted that these Figures are intended to illustrate the general characteristics of methods, structure and/or materials utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DESCRIPTION OF EXEMPLARY EMBODIMENTS

Exemplary embodiments will now be described in greater detail with reference to the accompanying drawings. In the drawings, the thicknesses and widths of layers are exaggerated for clarity. Exemplary embodiments may, however, be embodied in many different forms and should not be construed as limited to the exemplary embodiments set forth herein. Rather, these exemplary embodiments are provided so that this disclosure will be thorough and complete, and will fully convey the scope of exemplary embodiments to those skilled in the art.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
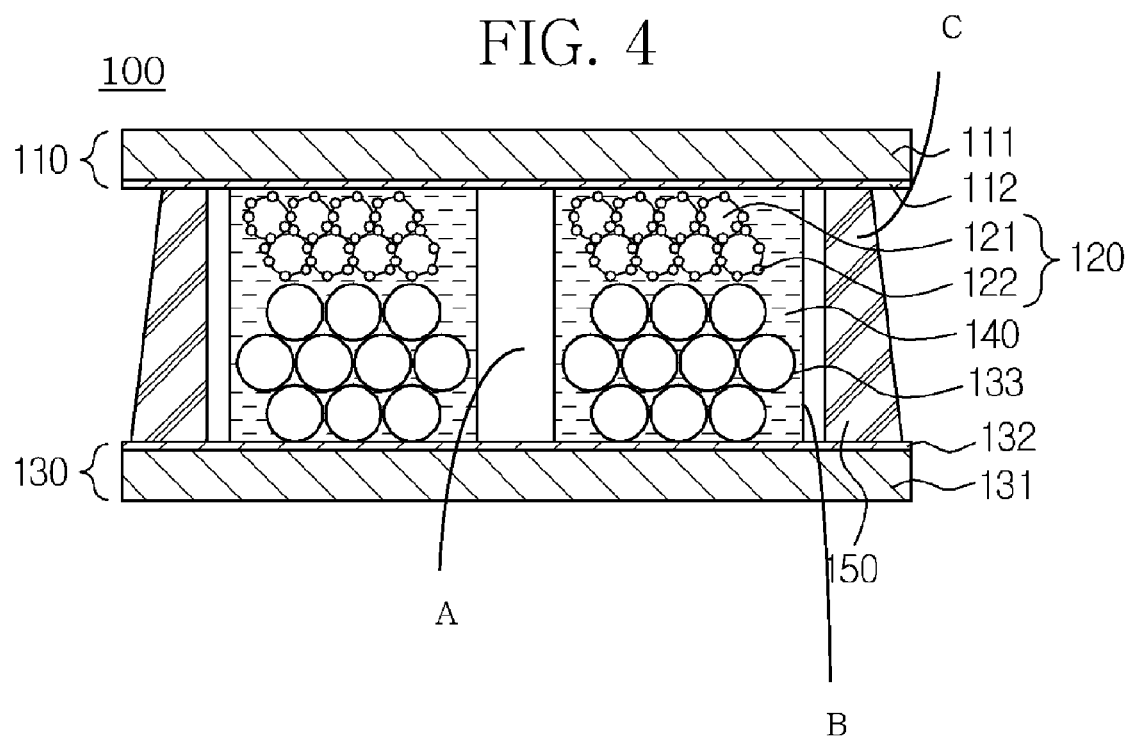

FIG. 4 is an exemplary cross-sectional view schematically illustrating the structure of an electrochromic device according to an embodiment of the invention. Referring to FIG. 4, the electrochromic device 100 comprises: a transparent electrode 110 which consists of a transparent substrate 111 and a first electrically conducting layer 112 disposed on the transparent substrate 111; an electrochromic layer 120 disposed on the transparent electrode 111; a counter electrode 130 which faces the transparent electrode 110 and comprises a counter substrate 131 and a second electrically conducting layer 132 disposed on the counter substrate 131; a reflective layer 133 disposed on the counter electrode 130; and an electrolyte layer 140 interposed between the transparent electrode 110 and the counter electrode 130.

Examples of the transparent substrate 111 include: inorganic substrates such as quartz, glass and the like; and transparent plastic substrates such as polyethylene terephthalate (PET), polymethylmethacrylate (PMMA), polyethylene naphthalate (PEN), polycarbonate, polystyrene, polypropylene, and the like. Preferred is the use of a flexible substrate, for example, a plastic substrate.

In addition, the conductive material coated on the substrate may be of any type so long as it is transparent. Examples are inorganic conductive materials such as indium tin oxide (ITO), fluorine-doped tin oxide (FTO), or the like, or a combination comprising at least one of the foregoing inorganic conductive materials, electrically conductive polymers such as polyacetylene, polyphenylacetylene, polythiophene, polyaniline, polypyrrole, or the like, or a combination comprising at least one of the foregoing electrically conductive polymers.

The electrochromic layer 120 comprises a nanostructure 121 and an electrochromic material 122. In one embodiment, the electrochromic material 122 is disposed on the nanostructure 121. It is desirable for the nanostructure 121 to be a semi-conductor. Examples of materials that can be used in the nanostructure are metal oxides. Examples of metal oxides are titanium dioxide ($TiO_2$), zinc peroxide ($ZnO_2$), copper oxide (CuO), or the like, or a combination comprising at least one of the foregoing metal oxides.

The nanostructure 121 may have a shape selected from spheres, tetrahedrons, cylinders, rods, triangles, discs, tripods, tetrapods, cubes, boxes, stars, tubes, and a combination comprising at least one of the foregoing shapes. Preferably, the nanostructure 121 may have a size of about 3 to about 100 nanometers (nm) and the electrochromic layer 120 may have a thickness of about 1 to about 50 micrometers ($\mu m$).

The electrochromic material 122 can comprise an inorganic or organic compound. Examples of the inorganic compound are tungsten oxide, rare earth compounds, ruthenium composites, molybdenum oxide, iridium oxide and prussian blue (ferric ferrocyanide). Examples of the organic compound are rare earth compounds, phthalocyanines, ruthenium composites, viologens, or the like, or a combination comprising at least one of the foregoing organic compounds.

The inorganic compound exhibits excellent environmental resistance and high resistance against degradation due to repeated display, but has a limitation on full-color representation because it is capable of representing only a single color such as blue, brown, red, green, or the like. The electrochromic devices of example embodiments may employ all of inorganic compounds that are being used at present and will be used in the future.

As shown in FIG. 4, the electrochromic device of is characterized in that the electrolyte layer 140 is present in only an active region of unit pixels. That is, the electrolyte is introduced into the space between the transparent electrode 110 and the counter electrode 130 and is distributed in only the active region, which comprises an electrochromic material 122 that is applied by spin coating and oven drying. When negative and positive electric fields are applied to the first electrode 112 (first electrically conducting layer) of the transparent electrode 110 and the second electrode 132 (second electrically conducting layer) of the transparent electrode 130, respectively, electrons are introduced into the electrochromic material 122 which is disposed on the transparent electrode 110, thereby exhibiting its inherent color. In this case, since the electrolyte layer 140 in contact with the electrochromic material 122 is not connected between adjacent unit pixels, crosstalk and image diffusion, which can otherwise result from ionic conductivity of the electrolyte are eliminated.

The active region is the region where the electrochromic material is coated, and this region is divided by A and B as depicted in the FIG. 4. The boundary of the unit pixel is same as active region and the unit pixel is patterned by traditional methods. The electrolyte is spin coated into the space between the transparent electrode 110 and the counter electrode 130.

Examples of the electrolyte include a metal salt. Examples of metal salts are lithium salts, potassium salts, sodium salts, or the like, or a combination comprising at least one of the foregoing salts. It is desirable for the salt to be dissolved in a solvent.

Examples of materials that can be used in the white-light reflective layer 133 are metal oxides, metal salts, or a combination comprising at least one of the foregoing metal oxides or metal salts. Examples of metal oxides or metal salts that can be used in the white-light reflective layer 133 are titanium dioxide ($TiO_2$), barium sulfate ($BaSO_4$), aluminum oxide ($Al_2O_3$), zinc oxide (ZnO), magnesium oxide (MgO), or the like, or a combination comprising at least one of the foregoing metal oxides or metal salts.

In addition, a counter layer is preferably formed on the second electrically conducting layer 132 of the counter electrode 130 so that the electrochromic material can efficiently induce the electrochemical reaction. Examples of materials that can be used in the counter layer are electrically conductive metal oxides. Examples of conductive metal oxides are antimony-doped tin oxide (ATO), indium tin oxide (ITO), or the like, or a combination comprising at least one of the foregoing metal oxides. Furthermore, the material for the conducting layer 132 of the counter electrode 130 is not necessarily transparent and any material may be used without particular limitation so long as it is electrically conducting.

Hereinafter, a method for fabricating the electrochromic device of the exemplary embodiments will be described in detail.

The method for fabricating the electrochromic device comprises forming an electrochromic layer on a transparent electrode, forming a reflective layer on a counter electrode, assembling the transparent electrode and the counter electrode and introducing an electrolyte into the space therebetween and isolating the electrolyte into an active region.

The materials that may be used in the method are the same as in those for the electrochromic device.

In an exemplary embodiment, in one method of manufacturing the electrochromic device, an electrically conducting material-coated transparent substrate, which is printed with a nanostructure, dried and calcinated, is dipped into a container containing an electrochromic material for 24 hours, to apply the electrochromic material to the nanostructure, thereby producing a working panel (an upper substrate). A paste for a reflector is printed on a substrate, on which a conductive electrode is formed, followed by drying and calcinating, to produce a counter panel (the lower substrate). Then, the upper and lower substrates were assembled through an alignment process, and an electrolyte is introduced into the space between the two substrates employing a capillary phenomenon. The production and assembly methods of the substrates are not limited to those as afore-mentioned above and any technique commonly used in the art may be used without particular limitation.

Isolating of the electrolyte into an active region is carried out by spin-drying and oven drying.

The assembled panel is spin-dried at room temperature a rotation rate of about 500 to about 2000 rpm for about 20 to about 40 seconds. After the spin-drying, the electrolyte present in regions, where the electrochromic material, electrolyte and the reflective material are in contact with one another between the upper and lower substrates, still remains in the region because of the capillary phenomenon. However, the electrolyte is discharged to the outside of the panel in regions where there is only the electrolyte between the substrates due to the rotary/centrifugal forces.

This is the reason that the electrolyte can be separated, that is, the electrolyte which present in regions where the electrochromic material/electrolyte/the reflective material are in contact with one another can not be separated by spin-drying because of the capillary phenomenon and adhesive force, but the electrolyte which present in regions where there is only the electrolyte between the substrates is separated due to the rotatory/centrifugal forces by spin-drying). As a result, the electrolyte present in all the space between upper and lower substrates is distributed in only the active region of unit pixels. The unit pixel is created by traditional patterning method. The resulting structure is subject to hot-air drying which is carried out several times on an oven or hot plate at about 10 to about 60 cycles per second (cycles/sec) and about 50 to about 90° C., to dry the residual electrolyte in the regions where the electrolyte has been removed.

Then, the space between the two substrates is sealed with an adhesive to fabricate an electrochromic device.

As mentioned above, the electrochromic device is fabricated by partial introduction of the electrolyte. For this reason, when an electric field is applied to the two substrates, there is a gap among the electrolyte of each unit pixel, and no electrolyte of each unit pixel is connected to one another. That is, the electrochromic device disclosed herein prevents crosstalk and image diffusion. Thus, the electrochromic device can be widely employed in flat-panel displays, and in particular, can be utilized in a variety of applications including flexible displays, electrical papers and the like.

As apparent from the above description, according to the electrochromic device described herein, the electrolyte layer is formed in only an active region of unit pixels by partial removal of the introduced electrolyte. For this reason, when an electric field is applied to the two substrates, no electrolyte that is in contact with the electrochromic material is connected to one another. The resulting electrochromic device is advantageous in preventing crosstalk and image diffusion.

Figure 2:
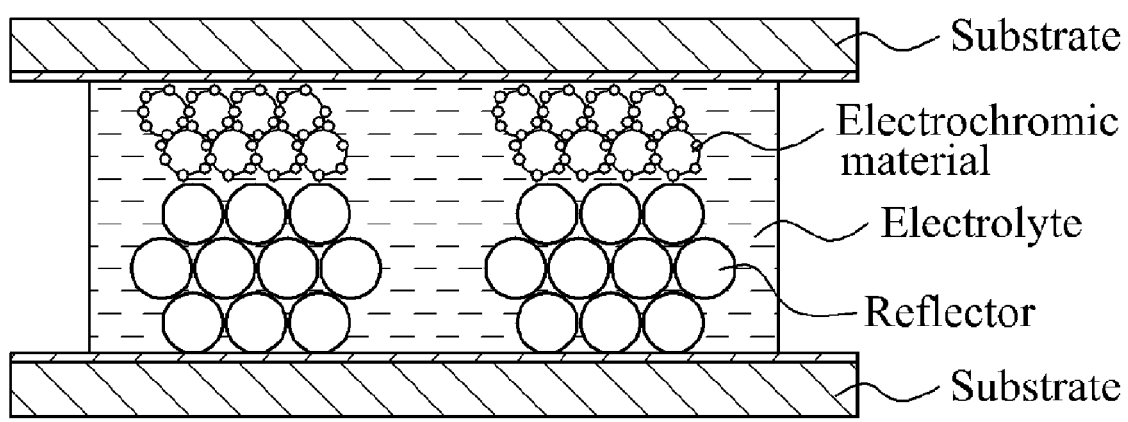
Figure 3:
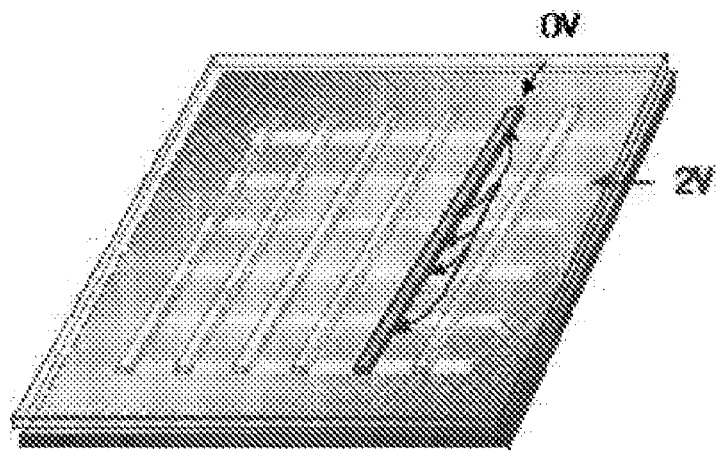

Accordingly, during operation of unit pixels by selection of X/Y lines, only the selected region of unit pixels is operated without causing either crosstalk or image diffusion, which are general problems resulting from the ionic conductivity of a continuous electrolyte, for example, the electrolyte as represented in FIG. 2. Thus, the electrochromic device of exemplary embodiments can realize passive matrix displays capable of representing a desired color.

Although exemplary embodiments have been disclosed for illustrative purposes, those skilled in the art will appreciate that various modifications and variations are possible, without departing from the scope and spirit of the appended claims. Accordingly, such modifications and variations are intended to come within the scope of the claims.

What is claimed is:

1. An electrochromic device comprising:
    a transparent electrode comprising a transparent substrate and a first electrically conducting layer disposed on the transparent substrate;
    an electrochromic layer disposed on the first electrically conducting layer;
    a counter electrode facing the transparent electrode and consisting of a counter substrate and a second electrically conducting layer disposed on the counter substrate; the first electrically conducting layer and the second electrically conducting layer facing each other;
    a reflective layer disposed on the second electrically conducting layer; and
    an electrolyte layer interposed between the transparent electrode and the counter electrode;
    wherein the electrolyte layer comprises an active region and an inactive region and an electrolyte is present in only the active region.

2. The electrochromic device according to claim 1, wherein the electrolyte layer is formed by spin-drying and oven drying.

3. The electrochromic device according to claim 1, wherein the electrochromic layer comprises a nanostructure and an electrochromic material.

4. The electrochromic device according to claim 3, wherein the electrochromic material is an inorganic, and organic materials or a combination of an inorganic material with an organic material.

5. The electrochromic device according to claim 4, wherein the inorganic material is selected from the group consisting of tungsten oxide, molybdenum oxide, iridium oxide, rare earth compounds, ruthenium compounds, prussian blue and a combination comprising at least one of the foregoing inorganic materials, and the organic material is selected from the group consisting of phthalocyanines or viologens.

6. The electrochromic device according to claim 3, wherein the nanostructure has a shape selected from the groups consisting of spheres, tetrahedrons, cylinders, rods, triangles, discs, tripods, tetrapods, cubes, boxes, stars, tubes and mixtures thereof.

7. The electrochromic device according to claim 3, wherein the nanostructure has a size of about 3 to about 100 nanometers.

8. The electrochromic device according to claim 3, wherein the electrochromic layer has a thickness of about 1 to about 50 micrometers.

9. A method for fabricating an electrochromic device comprising:
   forming an electrochromic layer on a transparent electrode;
   forming a reflective layer on a counter electrode;
   aligning the transparent electrode and the counter electrode so that the reflective layer and the electrochromic layer face each other;
   introducing an electrolyte into a space between the transparent electrode and the counter electrode; and
   isolating the electrolyte into only an active region to form the active region and an inactive region.

10. The method according to claim 9, wherein the isolation of the electrolyte into the active region is carried out by spin-drying and hot-air drying.

11. The method according to claim 10, wherein the spin-drying is carried out for a rotation time of about 20 to about 40 seconds.

12. The method according to claim 10, wherein the spin-drying is carried out at a rotation rate of about 500 to about 2,000 revolutions per minute.

13. The method according to claim 10, wherein the hot-air drying is carried out at about 50 to about 90° C. for about 10 to about 60 seconds.

* * * * *